Nov. 27, 1945.　　　J. L. HUDSON　　　2,389,667
FLUID VALVE CONTROL
Filed Dec. 30, 1943
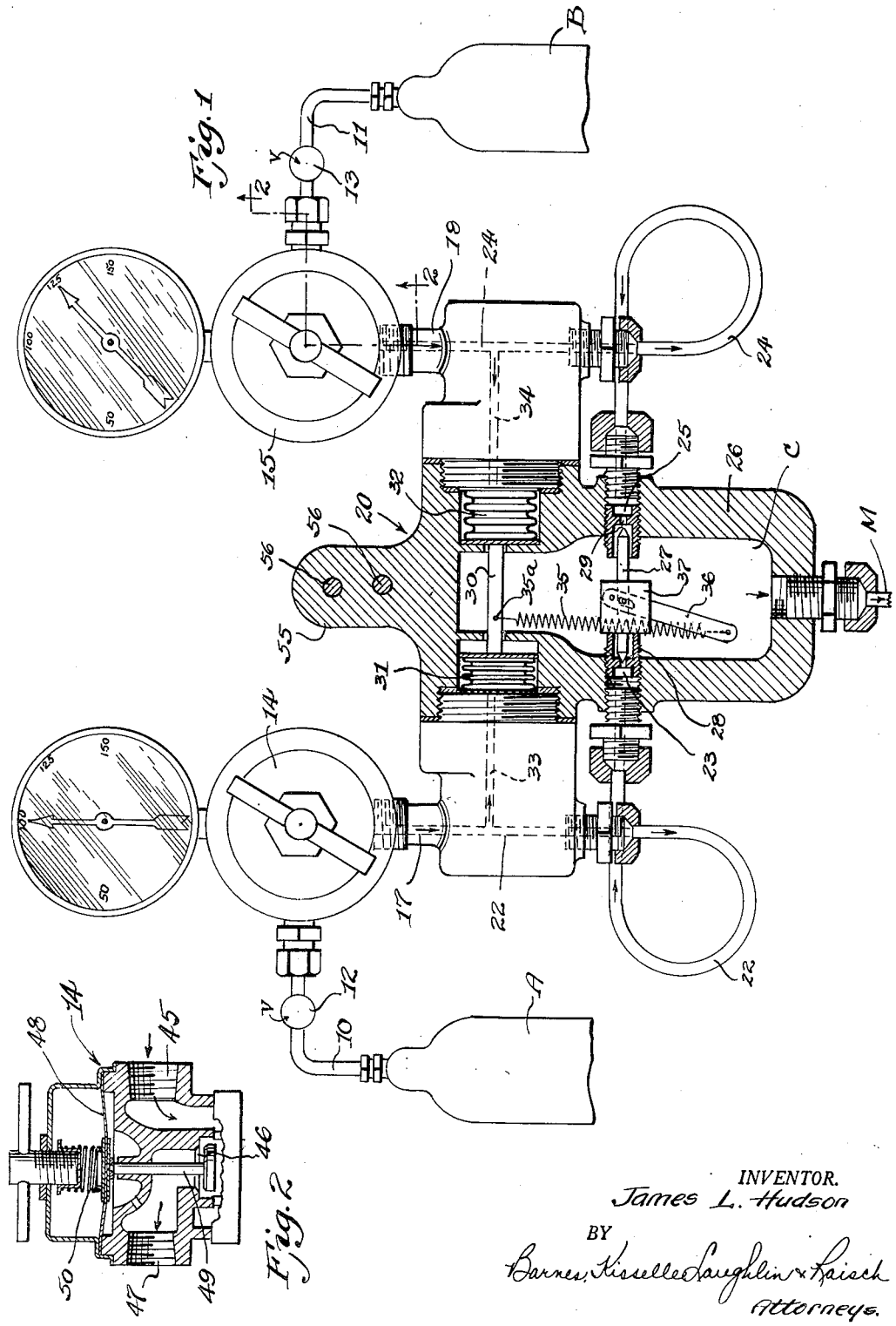
INVENTOR.
James L. Hudson Patented Nov. 27, 1945

2,389,667

UNITED STATES PATENT OFFICE 2,389,667

FLUID VALVE CONTROL

James L. Hudson, Detroit, Mich.

Application December 30, 1943, Serial No. 516,172

3 Claims. (Cl. 222—6)

This invention relates to a fluid valve control and has particularly to do with a device for supplying a constant flow of gas under regulated pressure from a plurality of containers.

Gases such as carbon dioxide, oxygen and the like are very often stored in tanks under an extremely high pressure. The gas is then used at a lower pressure by connecting a pressure regulator to the high pressure tank and bleeding the gas off as desired. When these tanks are used in connection with welding or carbonation of beverages or in hospitals, it is essential that some one connect and disconnect them as they become exhausted in their supplies. Because of the high pressure in the tanks some operators are reluctant to handle them and connect them.

It is an object of the present invention to provide a device which permits the connecting of a plurality of tanks to a supply line in such a way that one tank may be used until its pressure is depleted at which time the other tank is automatically connected to the supply line thus obviating the necessity for change over by the person using the gas. If the gas supply company services the installation at specified intervals they can always replace the depleted tank with a fresh tank without disturbing the set up. Particularly in beer and soda dispensing systems a continuous supply of $CO_2$ gas is necessary. The less attention that it is required from the owner or operator the better the system is liked.

It is an object of the present invention to provide a mechanism which permits this uninterrupted supply of gas under relatively constant pressure.

Other objects and features of the invention relating to details of construction such as the valve operation will be brought out in the following description and claims.

In the drawing:

Fig. 1 illustrates a diagrammatic setup of the circuit with parts of the valve in cross section to show the operation thereof.

Fig. 2 is a sectional view of a pressure regulator valve taken on line 2—2 of Fig. 1.

In the drawing two supply tanks for gas such as carbon dioxide are shown at A and B. Lines 10 and 11 lead through shut-off valves 12 and 13 to pressure regulators 14 and 15. These pressure regulators are connected to inlets 17 and 18 on either side of a housing 20. From inlet 17 a conduit 22 leads through the housing to a valve port 23. Similarly inlet 18 leads through a conduit 24 to a valve port 25, on the opposite side of a housing 26, from port 23. A double needle valve 27 is shiftable within the housing 26 to block ports 23 or 25 by seating in valve seats 28 or 29. Ports 23 and 25 open to a chamber C in housing 26. A common outlet M leads from chamber C.

In the housing 20 is a sliding bar 30 on each end of which is a Sylphon or diaphragm member 31 and 32. Each of these Sylphons is connected respectively by conduits 33 and 34 to conduits 22 and 24. A spring 35 pivoted at 35a on slide 30 leads down to the lower end of a lever 36 pivoted on a block 37. This block guides the double needle valve 27. The sliding bar 30, when actuated by one of the Sylphons 31 and 32, carries the upper end of the spring 35 along with it, and when that spring passes over a straight line through the two anchor points of the spring and the pivot on which the lever 36 swings, the lever snaps from one extreme position to the other and thereby shifts the needle valve 27 from one valve seat to the other valve seat, closing one of the ports and opening the other port. The block 37 is an integral part of the screw plug which is provided with the valve seat 28.

In Fig. 2 a sectional view of a standard pressure regulator is shown. An inlet 45 connects through a valve port 46 to an outlet 47. A diaphragm 48 controls a valve 49 while adjustable spring 50 biases the diaphragm. These pressure regulators are mounted directly on the housing 20 which, in turn, may be mounted on the wall by a bracket extension 55 and screws 56.

In the operation of the device, a $CO_2$ system may be assumed. The two drums A and B containing gas under pressure of 1500 to 2000 pounds per square inch are placed on either side of the separately supported unit and connected by pipes 11 and 12 to pressure regulators 14 and 15. Valves 12 and 13 may be turned on and gas will be fed under reduced pressure from the regulators to the control unit. The regulators in a carbonating system usually are set for 125 pounds per square inch.

Depending on which way valve 27 is shifted, gas will be fed through seats 28 or 29 to outlet M. Assuming that gas was originally being fed from tank A through port 23 and seat 28, the pressure on each Sylphon 30—32 would be 125 pounds per square inch since each regulator will be adjusted to the same pressure. Spring 35 has sufficient tension to allow for small variations without valve shifting.

Gas will be consumed from tank A until the pressure in the tank is reduced to below 125 pounds per square inch to, for example, 100 pounds per square inch. Then the pressure of 125 pounds per square inch on Sylphon 32 will cause it to expand sliding bar 30 to the left, as shown in Fig. 1. Lever 36 will then be snapped to the left and valve 27 can close port 23 and open port 25. Gas will then feed from tank B.

For most carbonating systems two supply tanks would last about two months, so there will be plenty of time for the gas supply to be serviced by an experienced person. While gas is feeding from tank B, tank A may be replaced without disturbing the system. When tank B drops to below 125 pounds per square inch, the system will again switch to replenished tank A. A device of this sort will prevent a soda clerk or bartender from being interrupted during a busy period by a gas depletion. Also in many cases of a single tank installation, there is no signal when the gas is exhausted, so that flat water or beer may be served before the condition is noticed.

The present invention would also be extremely useful in an automatic dispenser of carbonated beverage. Many times a service man must replace a tank which is just partially used, since he is not sure that the tank would last to his next visit.

The invention may also be used with so-called "converter" tanks. These tanks convert solid $CO_2$ into gaseous form and feed it under pressure to any particular system to which they are connected.

I claim:

1. For use in a gas supply system, having a plurality of high pressure containers, a housing having a plurality of inlets and a common outlet and provided with a chamber, slide means transverse of said chamber, pressure responsive means at each end of said slide exposed on one side to pressure at an inlet, opposed ports in said chamber walls, each arranged to connect an inlet with the outlet, valve means slidable across said chamber to close each of said ports alternately, and spring means operably connecting said slide and said valve means whereby a pressure differential between said inlet ports will cause shifting of the valve to open the port connected to the highest pressure inlet.

2. For use in a gas supply system having a plurality of high pressure containers, a housing having a plurality of inlets and a common outlet and provided with a chamber, slide means transverse of said chamber, pressure responsive means at each end of said slide exposed on one side to pressure at an inlet, opposed ports in said chamber walls each arranged to connect an inlet with an outlet, and a valve slide means transverse of said chamber substantially parallel with the first slide means arranged to close each of the opposed ports alternately, a snap action bar pivoted at one end on said valve slide and extending thereon away from the first slide means, and tension spring means connected at one end to said snap action bar and at the other end to the first slide means whereby shifting of said first slide means by differential pressure of inlet ports will cause responsive shifting of the valve to open the port connected with the highest pressure inlet.

3. For use in a gas supply system having a plurality of high pressure containers, a pressure reducing valve connected to the outlet of each container to control outlet pressure of each to a predetermined and equal operating pressure, a housing having an inlet for each container and a common outlet and provided with a chamber, slide means transverse of said chamber having pressure responsive means at each end thereof subject to pressure from the respective reducing valves, ports in said housing each arranged to connect an inlet with the outlet, a valve slide means movable to close said ports alternately, and a means connecting said slide means and said valve slide whereby movement of one causes movement of the other, said last means biasing said slides against movement except upon lowering of pressure at one reducing valve below the setting thereof.

JAMES L. HUDSON.